US012368265B2

(12) United States Patent
Arfaoui

(10) Patent No.: US 12,368,265 B2
(45) Date of Patent: Jul. 22, 2025

(54) CONNECTION SYSTEM FOR ESTABLISHING A DETACHABLE ELECTRICALLY CONDUCTIVE CONNECTION, AND CONNECTORS

(71) Applicant: Faisel Arfaoui, Eggenwil (CH)

(72) Inventor: Faisel Arfaoui, Eggenwil (CH)

( * ) Notice: Subject to any disclaimer, the term of this patent is extended or adjusted under 35 U.S.C. 154(b) by 380 days.

(21) Appl. No.: 17/938,441

(22) Filed: Oct. 6, 2022

(65) Prior Publication Data

US 2023/0037111 A1 Feb. 2, 2023

Related U.S. Application Data

(63) Continuation of application No. PCT/EP2021/058959, filed on Apr. 6, 2021.

(30) Foreign Application Priority Data

Apr. 7, 2020 (EP) .................................... 20168580

(51) Int. Cl.

*H01R 13/62* (2006.01)
*H01R 13/05* (2006.01)
*H01R 13/11* (2006.01)
*H01R 13/629* (2006.01)
*H01R 33/20* (2006.01)

(52) U.S. Cl.

CPC ......... *H01R 13/6205* (2013.01); *H01R 13/05* (2013.01); *H01R 13/11* (2013.01); *H01R 13/629* (2013.01); *H01R 33/20* (2013.01)

(58) Field of Classification Search

CPC .... H01R 13/6205; H01R 13/05; H01R 13/11; H01R 13/629; H01R 33/20

See application file for complete search history.

(56) References Cited

U.S. PATENT DOCUMENTS 3,808,577 A * 4/1974 Mathauser ......... H01R 13/6205 439/246
4,844,582 A * 7/1989 Giannini .............. G02B 6/4292 385/59

(Continued)

FOREIGN PATENT DOCUMENTS

CN 110098515 8/2019
DE 202017103605 7/2017

(Continued)

OTHER PUBLICATIONS

International Search Report and Written Opinion for PCT Application No. PCT/EP2021/058959 dated Jun. 9, 2021, 14 pages.

*Primary Examiner* — Thanh Tam T Le
(74) *Attorney, Agent, or Firm* — Jones Robb, PLLC

(57) ABSTRACT

The invention relates to a connection system for establishing a detachable electrically conductive connection, including a female connector and a male connector compatible therewith. The female connector includes a socket with annular concentric contact openings and contact elements arranged within the contact openings. The male connector includes a plug with contact elements which can be inserted into the contact openings of the socket. Ferromagnetic elements are arranged concentrically around the socket or the plug, the ferromagnetic elements of the male connector and of the female connector having mutual attraction in order to generate a retaining force between the two connectors.

20 Claims, 8 Drawing Sheets

(56) References Cited

U.S. PATENT DOCUMENTS

| | | | | |
|---|---|---|---|---|
| 7,192,303 | B2 * | 3/2007 | Kohen | H02G 3/20 439/537 |
| 7,311,526 | B2 * | 12/2007 | Rohrbach | G06F 1/18 439/39 |
| 7,329,128 | B1 * | 2/2008 | Awad | H01R 13/6205 439/38 |
| 7,658,613 | B1 * | 2/2010 | Griffin | H01R 13/6205 439/39 |
| 7,775,801 | B2 * | 8/2010 | Shiff | H01R 13/6205 439/700 |
| 8,602,795 | B2 * | 12/2013 | Hsu | H01R 13/6205 439/39 |
| 8,608,502 | B2 * | 12/2013 | Witter | H01R 24/38 439/38 |
| 8,702,594 | B2 * | 4/2014 | Edidin | A61B 1/00128 439/38 |
| 9,077,105 | B2 * | 7/2015 | Kim | H01R 13/6205 |
| 9,083,110 | B2 * | 7/2015 | McClelland | H01R 13/6205 |
| 9,196,979 | B2 * | 11/2015 | Kim | H01R 13/64 |
| 9,281,638 | B2 * | 3/2016 | McBroom | H01R 24/38 |
| 9,431,182 | B2 * | 8/2016 | Kim | H01R 13/7038 |
| 9,685,742 | B2 * | 6/2017 | Liu | H01H 37/002 |
| 9,806,458 | B1 * | 10/2017 | Chiu | H01R 13/40 |
| 9,985,384 | B1 * | 5/2018 | Johnson | H01R 13/64 |
| 10,522,943 | B1 * | 12/2019 | Termini | H01R 24/86 |
| 10,559,917 | B2 * | 2/2020 | Wang | H01R 13/745 |
| 10,989,400 | B2 * | 4/2021 | Kohen | F21V 23/06 |
| 11,070,004 | B2 * | 7/2021 | Lee | H01R 13/6205 |
| 11,223,151 | B2 * | 1/2022 | Underwood | H01R 13/04 |
| 11,374,367 | B2 * | 6/2022 | Johnson | H01R 13/641 |
| 11,462,855 | B2 * | 10/2022 | Doll | H01R 13/6205 |
| 11,916,333 | B2 * | 2/2024 | Kohen | H01R 24/38 |
| 11,919,410 | B2 * | 3/2024 | Galland | B60L 53/16 |
| 2009/0280673 | A1 * | 11/2009 | Kohen | F21V 23/06 439/529 |
| 2013/0040469 | A1 | 2/2013 | Hsu | |
| 2013/0303000 | A1 | 11/2013 | Witter et al. | |

FOREIGN PATENT DOCUMENTS

| | | |
|---|---|---|
| EP | 2533374 | 12/2012 |
| EP | 3364506 | 8/2018 |
| WO | 2016070244 | 5/2016 |
| WO | 2017160640 | 9/2017 |
| WO | 2021204813 | 10/2021 |

* cited by examiner

CONNECTION SYSTEM FOR ESTABLISHING A DETACHABLE ELECTRICALLY CONDUCTIVE CONNECTION, AND CONNECTORS

CROSS REFERENCE TO RELATED APPLICATIONS

This application is a continuation application of International Patent Application No. PCT/EP2021/058959, filed internationally on Apr. 6, 2021, which application claims priority to European Patent Application No. 20168580.7, filed on Apr. 7, 2020, the entire contents each of which are incorporated by reference herein.

TECHNICAL FIELD

The present description relates to a connection system for establishing a detachable electrically conductive connection of the type described in the claims, as well as a connector for such a connection system.

TECHNOLOGICAL BACKGROUND

The process of attaching ceiling lamps and other electrical consumers to a ceiling is comparatively complex. On the one hand, an electrical connection must be established and, on the other hand, a mechanical fastening must be provided. In the case of the voltages which are customary in building power supply systems, establishing the electrical connection is potentially dangerous and must be carried out by a specialist. The fact that electrical connection and mechanical suspension are carried out independently of each other additionally makes handling difficult since, for example, a lamp can generally only be mechanically fastened to the ceiling when the electrical connection has already been established. That is to say, the handling of the lamp is rendered difficult during the electrical mounting process.

By contrast, in the case of wall sockets, the plug is not securely fastened in the socket, so that in the event of a tensile loading which exceeds the—undefined—frictional force of the electrical contacts, the plug slides out of the socket. A similar problem arises when two power cables are connected by means of a plug and a coupling.

DE 20 2017 103 605 describes a lighting device having a supply module and a lighting module. The supply module and the lighting module each comprise multiple concentrically arranged ferromagnetic elements on their faces, which are arranged in such a way that the ferromagnetic elements of the supply module and of the lighting module have mutual attraction. In such a way, the lighting module can be coupled to the supply module arranged on a wall by means of magnetic attraction. The ferromagnetic elements simultaneously serve as contact elements for transmitting electrical energy and/or data. The contact elements are exposed both on the supply module and on the lighting module.

US 2013/0303000 describes a connection mechanism in which magnetically actuatable pins establish and mechanically secure a connection between two components. In addition, both components comprise ferromagnetic elements having mutual attraction on their faces which are intended to be arranged opposite each other. On the face of one of the components there are arranged concentric annular contacts, while the other of the components has a corresponding number of contact pins which configure dot-shaped contacts on the face and form a connection with the contacts of the first component in order to transmit electrical signals between the components.

However, exposed contacts are problematic if a supply module is connected to a power source having a high power and voltage: while a consumer-side connection is only live when it is connected to a supplier-side connection, a voltage-free state of the supplier-side connection cannot be inherently guaranteed in such a way that touching the contacts of the supplier-side connection is potentially dangerous.

PRESENTATION OF THE SUBJECT-MATTER OF THE PRESENT DESCRIPTION

The invention relates to a connection system for establishing a detachable electrically conductive connection of the type described in the introduction. According to one aspect, the disadvantages of the prior art should be avoided. According to more specific aspects of the described subject-matter, it should be possible, if need be, following initial installation of one of the connectors and the one-time connection thereof to the electricity grid by a specialist to establish the electrical connections necessary to operate a consumer, without having to use tools. According to a further aspect, the connection system should provide a minimum retaining force in the assembled state in such a way that the connection system can also be utilized for fastening consumers such as ceiling lamps to a ceiling, without having to install separate additional fastening elements. Equally, according to further aspects, the contact elements of at least one of the connectors should be protected against being touched. According to further aspects, it should be possible to rotate the connectors of the connection system relative to each other around a common axis and to fasten them to each other in various circumferential orientations.

Further effects and advantages of the subject-matter described here, whether explicitly indicated or not, will become apparent in light of the present description.

This is achieved by means of the connection system described in claim 1.

Accordingly, a connection system for establishing a detachable electrically conductive connection is described, which comprises a female connector and a male connector compatible therewith. Each of the connectors has a face, wherein at least one ferromagnetic element is arranged at a defined distance from an axis of the respective connector adjoining the face of each one of the connectors. In particular, all of the ferromagnetic elements are arranged at the same distance from the axis of the respective connector. A ferromagnetic element is, in particular, to be understood to be a permanent magnet or a magnetizable element which can be attracted by a permanent magnet. A permanent magnet is arranged and oriented in such a way that one of its poles points towards the face and another of the poles points away from the face. The distance of the at least one ferromagnetic element from the axis is identical in both connectors. The ferromagnetic elements comprise at least one permanent magnet, and at least one pair of ferromagnetic elements, a first pair of which is arranged on a first of the connectors and a second pair of which is arranged on a second of the connectors, and which are arranged and oriented in such a way that they have mutual attraction in at least one relative circumferential orientation of the connectors relative to each other if the faces of the connectors are adjacent to each other and the axes of the connectors are identical. The circumferential orientation of the connectors is to be understood to be the relative orientation thereof at relative rotation around the axes of the connectors, i.e., the location of a particular point on the circumference of the one connector relative to a particular point on the circumference of the other connector. The female connector comprises a socket and the male connector comprises a plug, wherein the socket comprises at least one contact element and the plug comprises at least one contact element. The contact elements are accessible from the face of the respective connector. The contact elements of the plug extend in particular from a front of the plug. The at least one contact element of the socket is countersunk within the socket and accessible through at least one contact opening of the socket, and each contact element of the plug can be introduced into a contact opening of the socket. The at least one contact opening of the socket is embodied rotationally symmetrically around the axis of the female connector. In this connection, a circular central opening with a contact element arranged therein is also understood to be a rotationally symmetrical contact opening. Each contact element of the plug is arranged at a defined distance from the axis of the male connector which corresponds to the distance of a contact opening of the socket from the axis of the female connector. This distance can also be "zero" so that the contact elements of the plug, in non-limiting embodiments, comprise a central contact pin. Contact elements of the plug are dimensioned in such a way that a contact element of the plug within the respective contact opening of the socket, the distance of which from the axis of the female connector corresponds to the distance of the contact element of the plug from the axis of the male connector, can be brought into contact with a contact element within the contact opening. By definition, only those elements on the plug are viewed as contact elements which come to lie in a contact opening of the socket when the connectors are fitted together. The fact that each contact element of the plug is arranged at a defined distance from the axis of the male connector, which corresponds to the distance of a contact opening of the socket from the axis of the female connector, means that each contact element of the plug is introduced into one of the contact openings when the faces of the connectors are brought together coaxially. Furthermore, it will be readily apparent to the person skilled in the art that the axes of the connectors can be defined by the center of a ring, on which the ferromagnetic elements are arranged, and/or can be defined by the center of the annular contact openings.

Within the framework of the present description, "a" or "an" is to be understood to be an indefinite article and not as a numeral, unless explicit reference is made to a different meaning, for example through the use of "precisely one".

The fact that the contact elements of the socket are countersunk within the socket means that these contact elements are protected against accidentally being touched. The female connector can thus be fastened, for example, to a ceiling or a wall and connected to a customary domestic voltage supply with the voltages customary in domestic networks of, by way of example, 240 V or 110 V or, for example, also 380 V, wherein the contact elements of the socket are live. If the male connector is inserted into the female connector as intended, wherein the axes of the male connector and of the female connector are congruent, it is possible to rotate the inserted male connector relative to the female connector around the common axis of the two connectors. The arrangement of the ferromagnetic elements is then also advantageously selected with such a circumferential symmetry that a magnetic attraction occurs between the female connector and the male connector in at least two circumferential orientations or rotational directions of the male connector relative to the female connector around the axis of the female connector. It can, for example, be provided that each of the connectors has eight discrete ferromagnetic elements uniformly distributed annularly and coaxially to the axis of the connector on its circumference. In this case, the circumferential orientation of the connectors can be changed relative to each other in 45-degree steps. If each of the connectors has six ferromagnetic elements distributed circumferentially as described, the circumferential orientation of the connectors can be changed relative to each other in 45-degree steps. With correspondingly more ferromagnetic elements distributed uniformly circumferentially, the increments of the possible circumferential orientations are correspondingly smaller. Embodiments are disclosed in which both connectors have an equal number of discrete ferromagnetic elements which are each arranged at the same distance from the axis of the respective connector, adjoining their face on a ring which is coaxial to the axis of the respective connector. For example, this can be at least six discrete ferromagnetic elements. In another example, this is at least eight discrete ferromagnetic elements. Equally, it is possible that at least one of the connectors has a single annular ferromagnetic element adjoining its face. Therefore, the relative circumferential orientation of the two connectors can be progressively varied relative to each other. On the other hand, embodiments in which both connectors are equipped with discrete ferromagnetic elements offer the advantage that they are easily detachable by rotating the joined-together connectors relative to each other. In such a way, if the female connector is fastened to a wall or ceiling, the male connector can be arranged in various circumferential orientations relative to the female connector. This is desirable, by way of example, if a consumer which has a preferred orientation is integrated into the male connector. In this way, for example, the lighting direction of a spot or the radiation direction of a loudspeaker which is integrated in the male connector can be varied by rotating the male connector around the axis of the permanently installed female connector.

That is to say, the subject-matter proposed here is particularly well suited to the flexible installation of electrical consumers, for example, in buildings. One of the connectors, preferably a female connector, is permanently installed as described above and connected to the electricity grid. It can be provided that a connection with a data network is also established. Various complementary connectors can be inserted as consumer connection units, to which different electrical consumers such as, by way of example, lamps or fans, or, for example, loudspeakers, cameras, routers, WLAN access points and the like, are connected to, or integrated into, this connector once it has been installed. The consumer connection units are retained by the ferromagnetic elements on the permanently installed connector. As described below, a mechanical safety device can additionally be provided. In particular, if the permanently installed connector is a female connector, the installation and the replacement of the consumer connection units with the consumers can be carried out by a layperson just as easily and safely as inserting a plug into a socket and extracting said plug from a socket, since the possibility of touching the voltage-carrying contacts is excluded.

In particular, it can be provided that the socket is a multipolar socket, and the plug is a multipolar plug. Furthermore, in particular all of the contact elements of the socket, which are accessible through a common contact opening, belong to one pole, and all of the contact elements of the plug, which are arranged at a particular distance from the axis of the male connector, belong to one pole. In particular, all of the contact elements which belong to one pole can be electrically conductively connected to each other, while they are electrically insulated from contact elements which belong to another pole.

It can be provided that each pole of a multipolar socket is assigned to precisely one contact opening of the socket, or each contact opening of the socket provides the connection for one pole of the socket. Accordingly, in such an embodiment, each pole of the multipolar plug would be provided by the contact elements at a particular distance from the axis of the male connector. The aforementioned formulations do not exclude the possibility that only precisely one contact element belongs to one pole of the socket and/or one pole of the plug. In particular embodiments, the number of poles is at least two, namely one pole for the phase and one pole for the neutral conductor. It can be provided that the number of poles is at least 3, namely one pole each for the phase, the neutral conductor and the protective ground. A correspondingly larger number of poles can be provided for transmitting multiphase alternating current. Equally, it can be provided that two or more phase connections are provided for different simultaneously connected consumers which are, for example, fused or switched independently of each other. Thus, a pole can be connected, by way of example, to a phase which is switched via a light switch, and another can be connected to an unswitched phase. One pole can be provided for a common neutral conductor for all of the phases, or a separate pole can be provided for the neutral conductor for each phase. As indicated above, in addition to the poles indicated above, which are provided for the power transmission, further poles can be provided for the transmission of data and/or control signals.

In further, non-limiting embodiments, the at least one contact opening of the socket comprises a central opening and the at least one contact element of the plug comprises a central pin. In other embodiments, means for coupling fiber-optic cables are provided centrally in the socket and in the plug so that an optical data transmission can take place centrally between the two connectors.

It can be provided that the connectors, in addition to the ferromagnetic elements which constitute a magnetic coupling device, comprise means for positively securing the connectors to each other. To this end, in non-limiting embodiments, a pair of mating connection threads can be arranged on the faces of the connectors, the thread axes of which coincide with the axes of the connectors.

Furthermore, a connector for a connection system of the type described above is disclosed.

The at least one ferromagnetic element can be configured annularly and concentrically around the axis of the connector. In other embodiments of a connector, it can be provided that the at least one ferromagnetic element comprises a number of discrete ferromagnetic elements which are arranged annularly and uniformly distributed in the circumferential direction around the axis of the connector. Examples of possible numbers of discrete ferromagnetic elements are given above. In this connection as well, it is understood that the magnets are arranged on the circumference of the connector coaxially to the axis of the connector. The two specific embodiments indicated above can be combined within one connection system.

According to further aspects of the subject-matter described here, a male connector is indicated, in which at least one contact element is configured as a ring which extends in a centered manner around the axis of the connector. Such an embodiment guarantees, irrespective of the circumferential orientation of the male connector relative to the female connector, a consistent contact between the contact element of the male connector and a corresponding contact element of the female connector. According to a further aspect, a contact element can be embodied as a central pin on the male connector.

On a female connector, it can be provided that the contact elements are arranged at least 5 mm deep, and in particular at least 6 mm deep, within the contact openings, and the smallest cross-sectional dimension of a contact opening is a maximum of 4 mm, in particular a maximum of 3 mm. In this way, it is ensured that the contact elements of the female connector cannot be touched with a finger.

It can furthermore be provided that a connection thread is arranged on the face of the connector, the thread axis of which connection thread coincides with the axis of the connector. It can furthermore be provided that the connection thread is arranged on a thread element which is connected to the connector via a torque-controlled coupling which limits the torque which can be transmitted between the thread element and the connector at least in one direction of rotation, and wherein the torque which can be transmitted when unscrewing the connection thread is larger than the torque which can be transmitted when tightening the fastening thread. The connection thread is provided in order to fasten the connector mechanically to or on another component, by way of example the other connector of a connection system. The tightening and unscrewing of the connection thread refer to the tightening of the connection thread on a connection thread of the counterpart or the loosening of the connection thread from the connection thread of the counterpart. By limiting the torque during tightening, overtightening of the interacting connection thread and the resulting damage are avoided. On the other hand, the fact that a larger torque can be transmitted during unscrewing of the fastening thread than during tightening thereof guarantees that, once a connection thread has been tightened, it can also be safely detached again. Means can be provided, which make it possible to bridge and, therefore, fix or block the torque-controlled coupling in the event that, due to the coupling being damaged, it is no longer possible to transmit a torque sufficient to unscrew the fastening thread. In this way, it is guaranteed that the connector can be detached from its counterpart again whatever happens.

According to yet another aspect, it can be provided that the connector has a housing which is perforated in such a way that ambient air can flow through the housing into the connector. This makes it possible, for example, to integrate a smoke detector into the connector. It is advantageous if in particular a female connector with a perforated housing is embodied. As indicated above, the female connector is in particular suitable for permanent mounting to a ceiling or wall and, therefore, for the integration of a smoke detector.

Furthermore, in a connection system of the type described above, functional intermediate parts can be provided, which are embodied on one face as a plug and on a opposite face as a socket. These can be arranged between the two connectors. An electrical connection is provided between the contact elements in both faces of a functional intermediate part in such a way that a voltage applied to the contact elements on one face is also applied to the contact elements on the other face. A plurality of, basically, any functions can be implemented in the functional intermediate parts. For example, a functional intermediate part can be embodied as a WLAN access point or as a remote-controlled switch for switching a consumer connected to the connection system on and off. With the aid of the functional intermediate parts, the connection system can be expanded in an extremely flexible and modular manner by the user.

It can be provided that in addition to or instead of contact elements which are provided for transmitting electrical power, interacting contact elements of the socket and of the plug which are intended to transmit signals are also provided within the connection system. This is to be taken into account when determining the number of poles of the plug and of the socket. Equally, means for optical data transmission between the connectors can be arranged centrally in the connectors. It can be provided that a reader for RFID chips is arranged in one of the connectors, in particular in the female connector. An RFID chip can be arranged in the complementary connector. Consequently, a connector which is permanently installed in a building can use a reader to identify which consumer is connected to it. This makes it possible to implement a plurality of further intelligent functions.

A housing of a connector can be screwed onto a circumferential external thread. This external thread can likewise be utilized in order to affix modular rings having further functional units to a connector. The entirety of the connector thus expanded can subsequently be covered with a correspondingly larger housing.

The specific embodiments indicated above can be combined with each other. Further embodiments of the teaching of this document, which are not specifically disclosed, will be readily apparent to the person skilled in the art.

BRIEF DESCRIPTION OF THE FIGURES

The facts set out here are explained in greater detail below on the basis of selected embodiment examples depicted in the drawings, wherein.

The drawings are extremely schematized. Details which are not necessary in order to understand the subject-matter described have been omitted. Furthermore, the drawings only show selected embodiment examples and must not be enlisted in order to restrict the subject-matter outlined in the claims. Embodiments not shown can definitely be covered by the claims.

EMBODIMENT EXAMPLES

Figure 1:
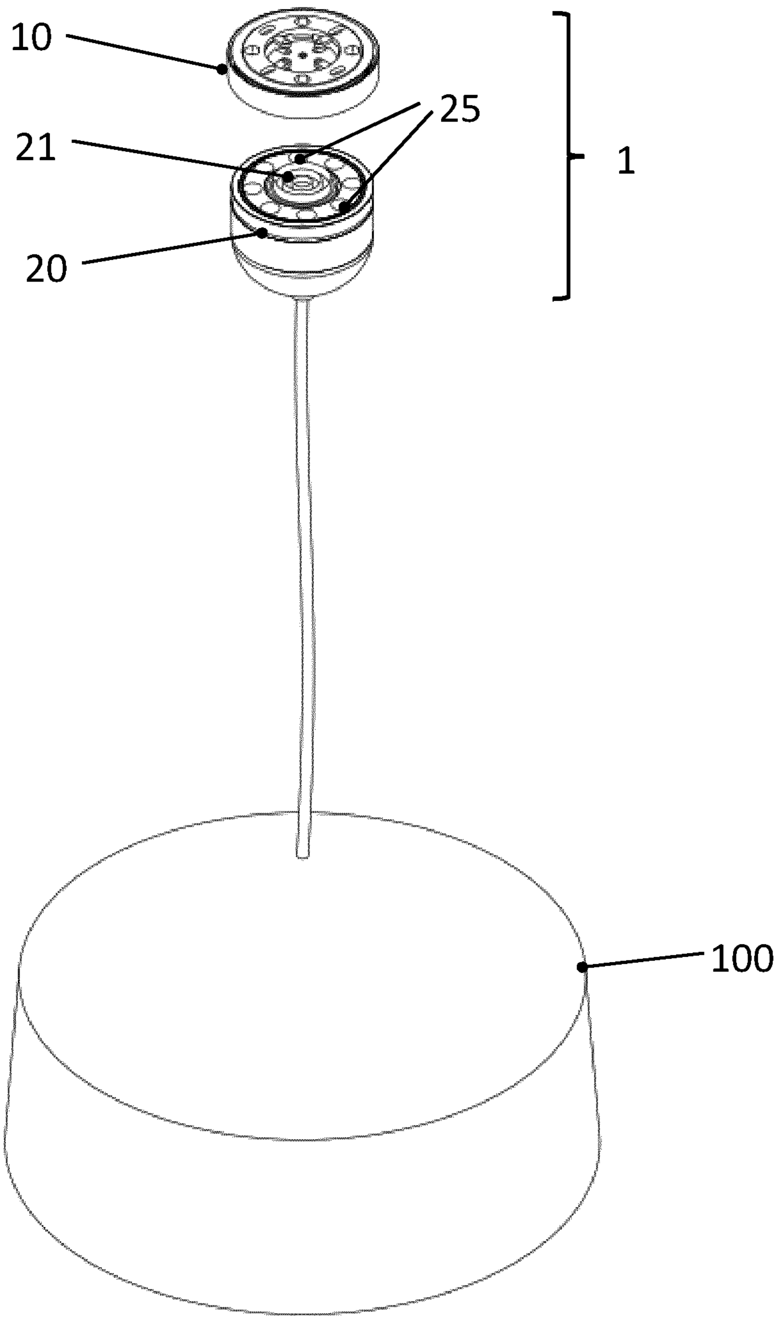
FIG. 1 shows a lamp which is connected to a power supply by means of a connection system of the type described here.

FIG. 1 shows, as an example of the application of the connection system described here, the suspension and connection of a lamp 100 to a ceiling. The lamp 100 is connected to a male connector 20 which can also be referred to as a consumer connection unit in the present context. The female connector 10 is also referred to as an installation unit in the present context. The installation unit 10 is intended to be mounted on a ceiling and wired to the building's electrical installation. Therefore, the female connector 10 is also preferably selected as an installation unit since, following installation and connection of the installation unit to the building power installation, live contact elements are countersunk in the socket, which is not visible in the present perspective, and therefore protected against being touched accidentally. The consumer connection unit 20 comprises, on its face, the contact elements of the plug 21 as well as a number of ferromagnetic elements 25 distributed on the circumference of the face. The contact elements of the plug 21 are embodied in the form of concentric rings around an axis of the consumer connection unit. The ferromagnetic elements 25 are arranged radially outside of the plug and coaxially to the plug 21 and are uniformly distributed on the circumference. As explained further below, the installation unit 10 also has ferromagnetic elements on its face or adjoining its face, which are arranged at a distance from the axis of the installation unit, which corresponds at least approximately to the distance of the ferromagnetic elements 25 of the consumer connection unit from the axis of the consumer connection unit. The lamp 100 can be connected to the electricity grid very simply by inserting the plug 21 of the consumer connection unit into the socket of the installation unit. The ferromagnetic elements on the face of the consumer connection unit and of the installation unit come to lie opposite each other. Either only the ferromagnetic elements of one of the two units 10 and 20 are permanent magnets, or the ferromagnetic elements in the consumer connection unit below the installation unit are polarized in such a way that opposing poles of permanent magnets are opposite each other. In this way, the consumer connection unit 20, together with the lamp 100, is held by magnetic attraction between the consumer connection unit and the installation unit on the installation unit which, in turn, is fastened to the ceiling. As described below, an additional mechanical fixation can furthermore be provided between the installation unit and the consumer connection unit. The lamp or another consumer can therefore be installed without tools, even by a layperson, very easily and without the risk of an electric shock.

Figure 2:
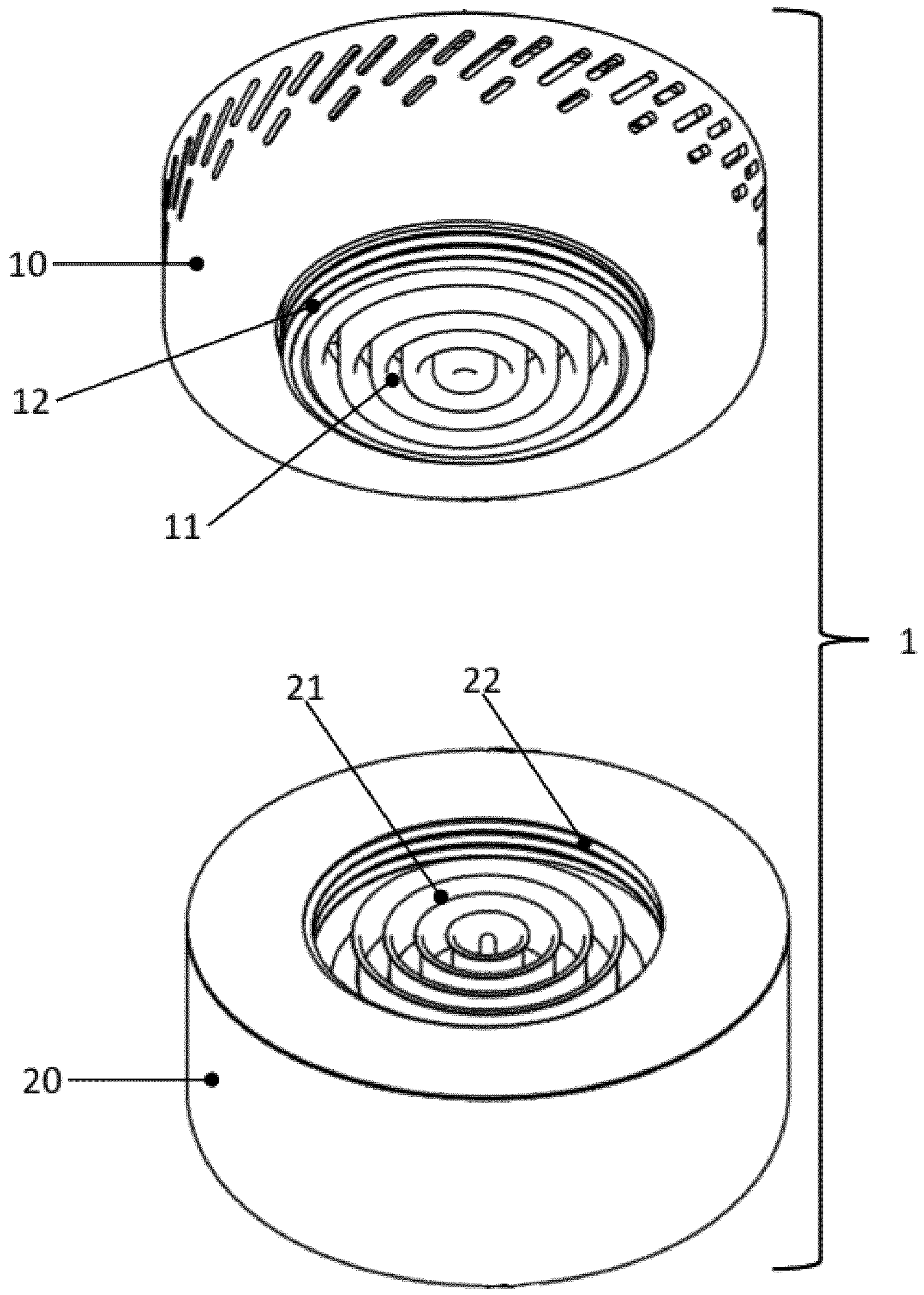
FIG. 2 shows the interacting connectors of a connection system of the type described here.

FIG. 2 shows an embodiment example of a connection system 1. As can be seen and described above, the installation unit 10 is a female connector with a socket 11, in which the contact elements are countersunk within the socket and are accessible through contact openings of the socket. The consumer connection unit comprises the plug 11 with contact elements which are dimensioned and arranged in such a way that they can be inserted into the contact openings of the socket 11. Furthermore, an external thread 12 is arranged as a fastening thread on the installation unit 10, and an internal thread 22 which is compatible and complementary to this external thread is arranged as a fastening thread on the installation unit 20. By screwing the two fastening threads together, the connectors 10 and 20 can be mechanically secured to each other in addition to the magnetic fixation. In the depicted embodiment example, the housing of the installation unit is perforated in such a way that outside air can flow into the housing. In such a way, the installation unit is suitable for integrating a smoke detector as well, for example. Other functional components can also be arranged within the installation unit.

Figure 3:
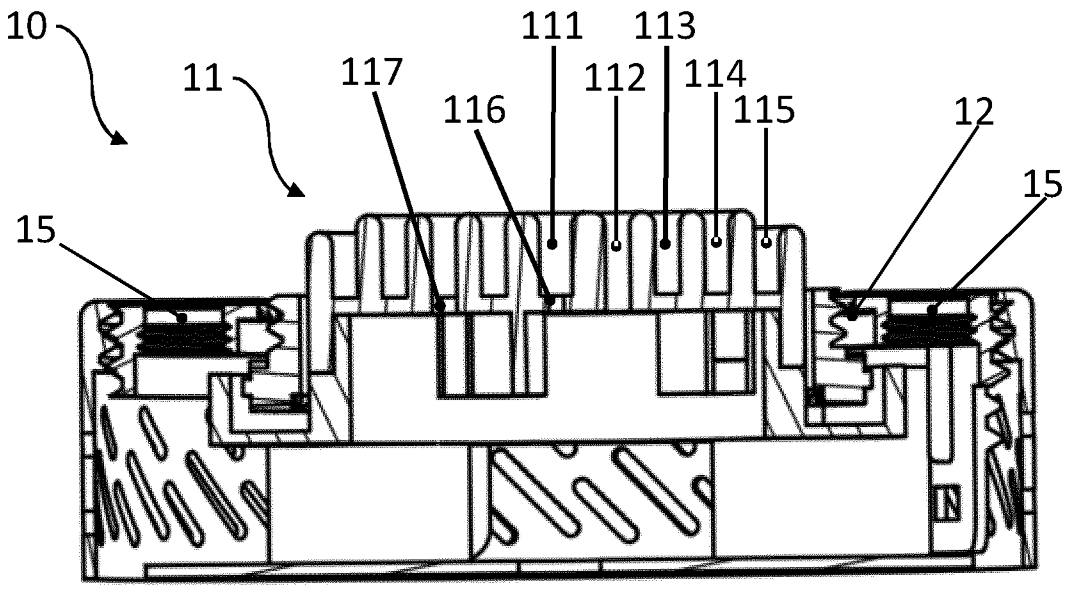
FIG. 3 shows a cross-section through a female connector.
Figure 4:
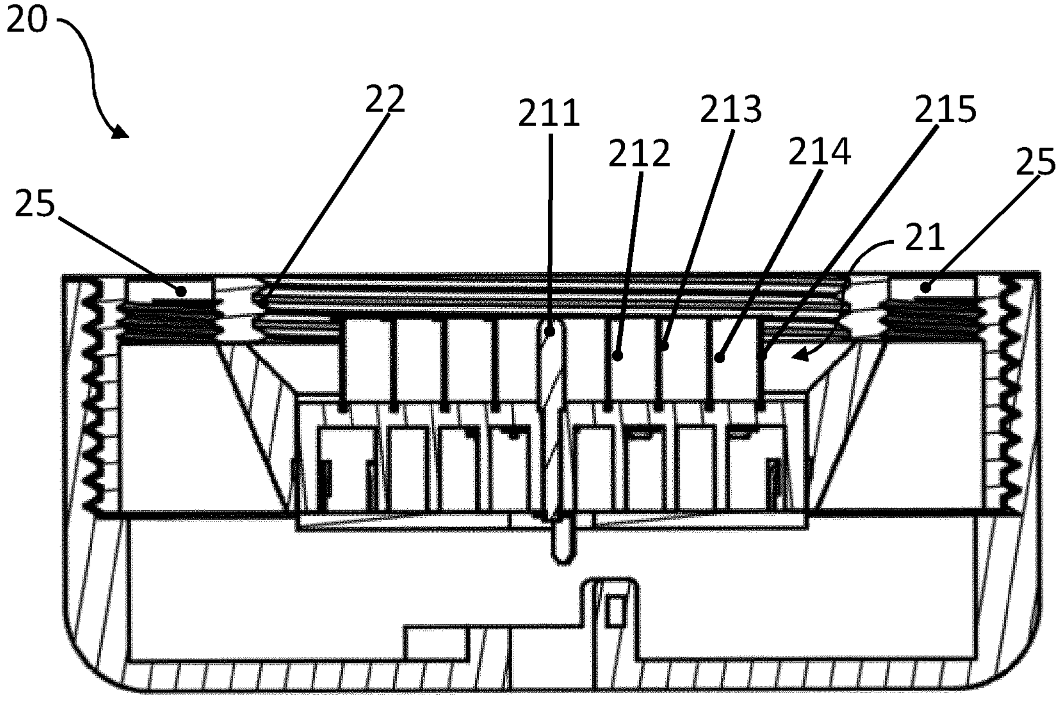
FIG. 4 shows a cross-section through a male connector.

FIGS. 3 and 4 show sectional views of the connectors depicted in FIG. 2. FIG. 3 shows the female connector, or the installation unit 10, and FIG. 4 shows the male connector, or the consumer connection unit, 20. Some of the ferromagnetic elements 15 and 25 are visible in each of the two figures. These are supported against a wall on the face towards the front and held from the rear by grub screws. The socket 11 is in particular visible in the section in FIG. 3. The socket 11 has a central contact opening 111, as well as the annular contact openings 112, 113, 114 and 115. The central contact opening 111 and the annular contact openings 112, 113, 114 and 115 are arranged rotationally symmetrically and concentrically around the central contact opening 111 or an axis of the connector or of the socket. The contact elements of the socket are arranged on different circumferential positions within the contact openings. Therefore, only the contact element 116 of the central contact opening 111 as well as a contact element 117 of the annular contact opening 113 are visible in the depicted view. In FIG. 4, the plug 21 is depicted in a longitudinal section, which has the central contact pin 211 as well as the concentric annular contact elements 212, 213, 214 and 215 as contact elements. The radii or diameters of the annular contact elements 212, 213, 214 and 215 correspond to the radii or diameters of the annular contact openings 112, 113, 114 and 115. The annular contact elements 212, 213, 214 and 215 of the plug 21 run concentrically around an axis of the male connector 20 or around the central contact pin 211. In such a way, the contact elements of the plug 21 can be inserted into the contact openings of the socket 11 and establish the contact with the contact elements of the socket there. As can be seen in FIG. 3, the contact elements of the socket are countersunk within the socket and accessible through the contact openings. The contact openings are dimensioned in such a way, and the contact elements are arranged deep in the contact openings in such a way, that the possibility of accidentally touching the contact elements of the socket is excluded. For example, the smaller dimension of a contact opening in cross-section is a maximum of 4 mm, in particular a maximum of 3 mm, which prevents a finger from being inserted into a contact opening. Equally, the contact elements of the socket lie at least 5 mm and in particular at least 6 mm deep in the contact openings. It goes without saying that the height of the contact elements of the plug must be sufficiently dimensioned in order to reach the contact elements of the socket countersunk within the contact openings, and to establish contact with them.

Figure 5:
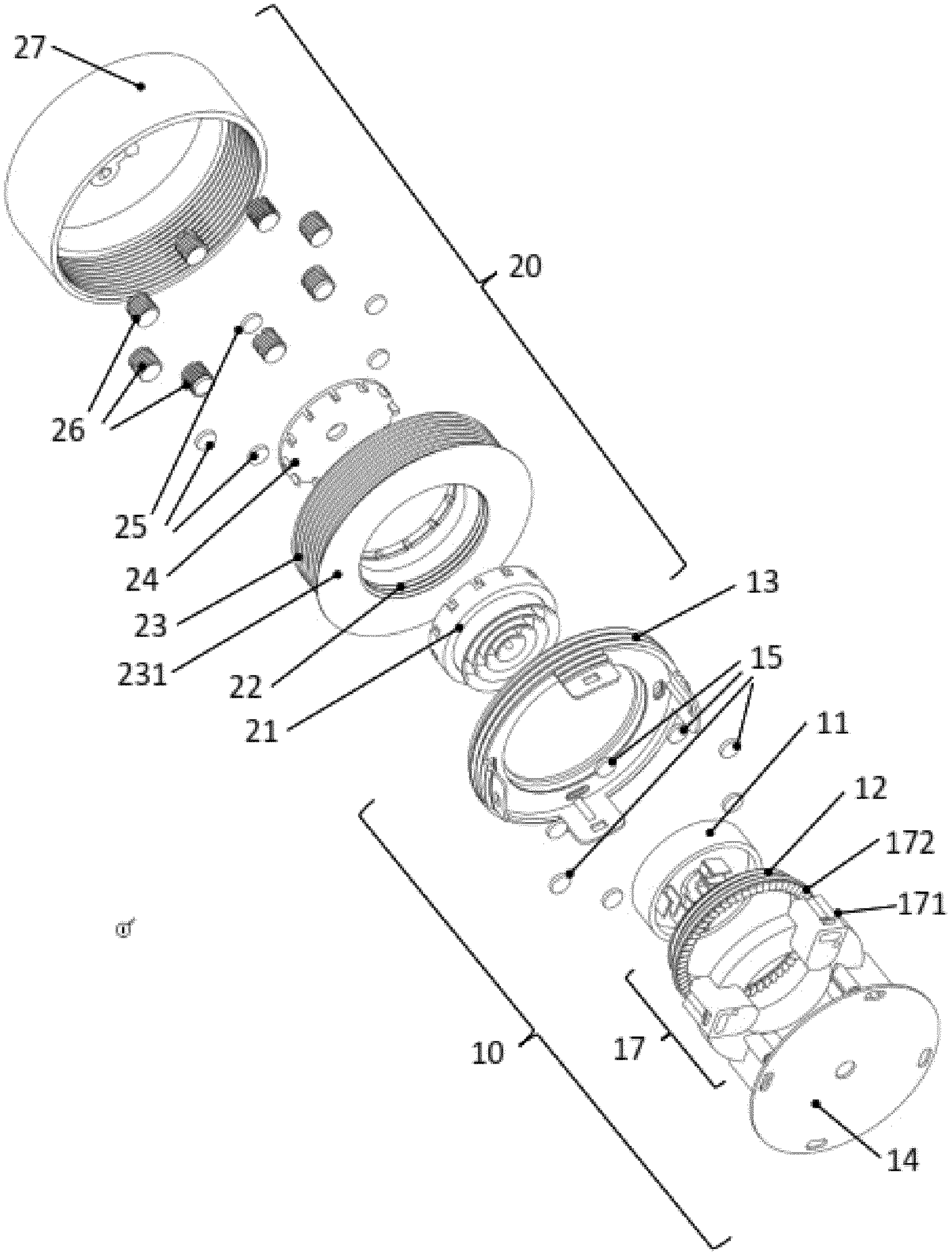
FIG. 5 shows a connection system of the type described here in an exploded view.

FIG. 5 shows the connection system from FIG. 2 in an exploded view, wherein the housing of the installation unit has been omitted. The consumer connection unit or the male connector 20 comprises the plug 21 which is fixed with a counter plate 24 in a carrier 23. The internal thread 22 is arranged in the carrier adjoining a face of the carrier 23. The carrier 23 furthermore has an external thread, onto which a cover or housing 27 can be screwed. Furthermore, the consumer connection unit comprises a number of magnetic or magnetizable ferromagnetic elements 25 which can be fixed by means of grub screws 26 within the carrier 23 adjoining the front face 231 of the carrier. Equally, the magnet elements 25 could also be fixed by gluing or another suitable fastening on the rear side of the face 231 of the carrier 23. The installation unit or the female connector 10 likewise comprises a carrier 13 with an external thread, onto which a housing of the installation unit which is not depicted can be screwed. The installation unit 10 likewise comprises a number of ferromagnetic elements 15 which are arranged on the rear side of the face of the carrier 13. The number of magnet elements 25 in the consumer connection unit and of the magnet elements 15 in the installation unit is preferably identical and, furthermore, the magnet elements are each preferably uniformly distributed on the circumference of the faces. The magnet elements are each selected or polarized so that there is at least one circumferential orientation of the installation unit and consumer connection unit relative to each other, in which opposite ferromagnetic elements of the installation unit and the consumer connection unit have mutual attraction. For example, all of the ferromagnetic elements 15 and 25 could be permanent magnets, wherein all of the permanent magnets 15 of the installation unit are arranged with the south pole pointing towards the face of the installation unit, while all of the permanent magnets 25 of the consumer connection unit are arranged with the north pole pointing towards the face of the consumer connection unit. If, by contrast, one of the connectors does not have any permanent magnets, the polarity of the permanent magnets in the complementary connector is irrelevant for the time being. In such a way, it is possible to couple the installation unit and the consumer connection unit, or the connector 10 and 20, by simply placing the respective faces on each other. Furthermore, the connectors comprise the complementary threads 12 and 22 which can consequently be screwed together. Furthermore, the installation unit or the female connector comprises a torque-actuated coupling 17, via which a torque can be transferred between the thread 12 and the further component parts of the installation unit. For example, when screwing on the consumer connection unit, the torque required for screwing on and tightening the consumer connection unit must be supported against the installation unit fastened to a ceiling, for example. The torque-actuated coupling limits the torque which can be transmitted and supported in the tightening direction in such a way that damage to the threads 12 and 22 is avoided. The torque-actuated coupling 17 comprises a first, component-fixed coupling element 171 which is permanently connected via a base plate 14 to the carrier 13 and the housing (not depicted) of the installation unit. Furthermore, the torque-actuated coupling 17 comprises a second, threaded coupling element 172 which, in the present embodiment example, is embodied in one piece with the thread 12. The threaded coupling element comprises a toothing, the teeth of which are arranged next to each other in the circumferential direction and point with their tooth height in the axial direction. The socket 11 can, for example, be fastened to the component-fixed coupling element 171 or directly to the base plate 14. The threaded coupling element 172 is basically embodied annularly, wherein the socket 11 is guided axially through the central opening of the threaded coupling element.

Figure 6:
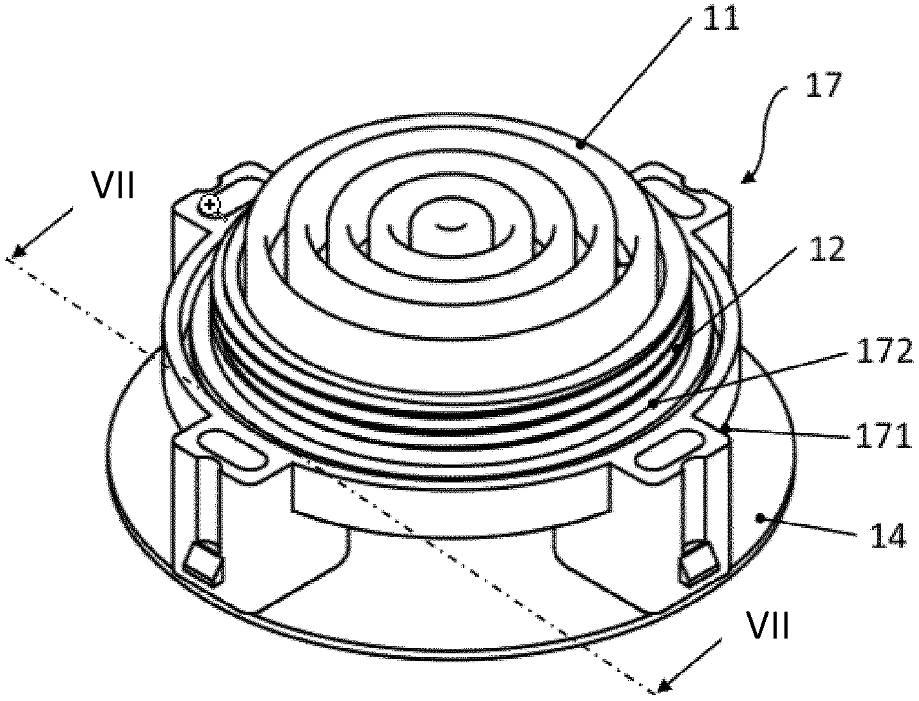
FIG. 6 shows a base plate and electrical connecting element having a fastening thread which is connected to the base plate and the electrical connecting element via a coupling.

FIG. 6 shows an assembly view of the torque-controlled coupling 17 with the socket 11. As can be seen, the component-fixed coupling element 171 is connected to the base plate 14. The socket 11 is, for its part, arranged within the threaded coupling element 172 with the fastening thread 12 and is fixedly connected to the component-fixed coupling element 171 and, therefore, to the base plate 14.

Figure 7:
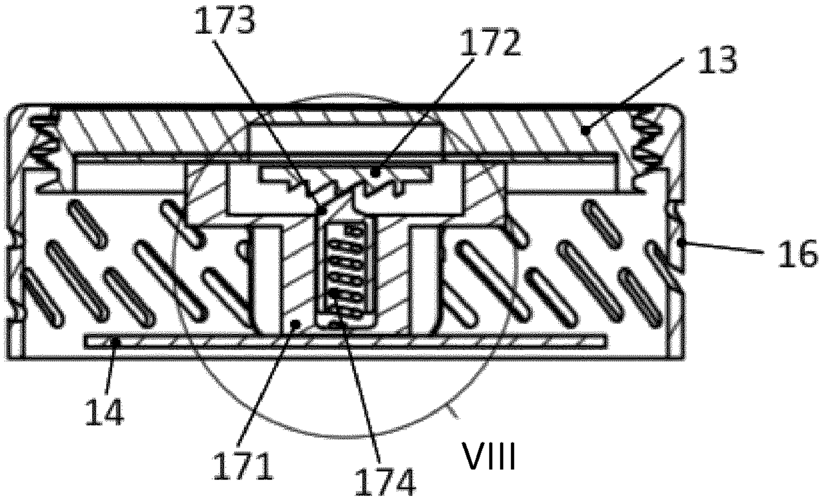
FIG. 7 shows a sectional view from FIG. 6, in which the force transmission and release mechanism of the coupling is visible.
Figure 8:
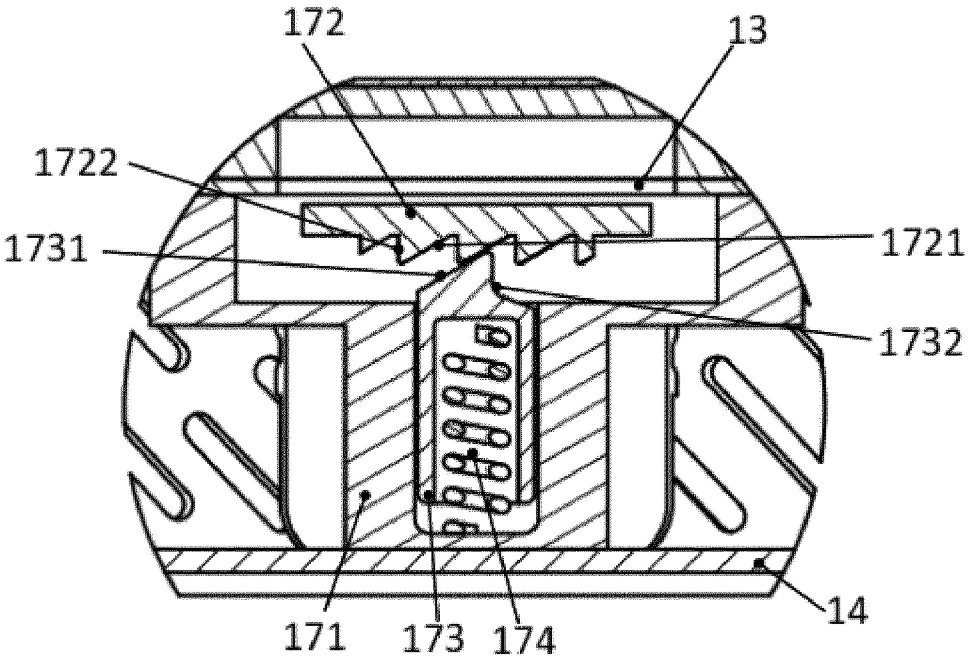
FIG. 8 shows a detailed representation of the force transmission and release mechanism from FIG. 7.

FIG. 7 shows a section along the line designated by VII-VII in FIG. 6, wherein the housing 16 of the installation unit or of the female connector is likewise depicted. A detent 173, which is axially biased by a spring 174 against the toothing of the threaded coupling element, is arranged in a recess of the component-fixed coupling element 171. At its rear end, the spring 174 is supported against the component-fixed coupling element. Due to the spring bias, a distal end of the detent 173 is in engagement with the toothing of the threaded coupling element. The threaded coupling element 172, the spring 174 and the detent 173 are axially braced between the component-fixed coupling element 171 and the carrier 13. The interaction of the detent 173 and the toothing of the threaded coupling element 172 is explained in more detail in connection with detail VIII from FIG. 7 depicted in FIG. 8. Both the teeth of the toothing and the distal end of the detent are embodied unsymmetrically in the circumferential direction of the toothing. Each tooth of the toothing on the threaded coupling element 172 has a ramp-shaped first flank 1721 which is designed to be comparatively flat to the circumferential direction of the threaded coupling element 172 or the thread 12, as well as a steep second flank 1722 which is inclined steeply with respect to the circumferential direction of the threaded coupling element or encloses a larger angle with this circumferential direction than the ramp-shaped flank 1721. Equally, the distal end of the detent 173 has a ramp-shaped first flank 1731 which is arranged comparatively flat to the circumferential direction of the threaded coupling element 172 or the thread 12, as well as a steep second flank 1732 which is inclined steeply with respect to the circumferential direction of the threaded coupling element or encloses a larger angle with this circumferential direction than the ramp-shaped flank 1731. The detent 173 is arranged in such a way that, depending on the direction of a torque transmitted between the threaded coupling element and the component-fixed coupling element or the circumferential force necessary for this, this circumferential force is transmitted in each case between the ramp-shaped flanks 1721 and 1731 or the steep flanks 1722 and 1732 of the toothing on the threaded coupling element and the detent. When a torque is applied in a direction in which the circumferential force is transmitted between the ramp-shaped flanks 1721 and 1731, the circumferential force to be transmitted induces an axial force on the spring-loaded detent 173, as a result of which the spring 174 is compressed and the distal end of the detent is gradually moved along the ramp-shaped flank 1721 in the direction of the tip of the respective tooth of the toothing of the threaded coupling element. If the torque is transmitted via the coupling and, therefore, the circumferential torque between one tooth of the toothing on the threaded coupling element and the detent is so large that the resulting compression force which acts on the spring 174 compresses the spring so far that the tip of the detent is pressed over the tip of the tooth of the toothing, the torque transmission via the coupling is interrupted and the coupling slips through. The ramp-shaped flanks are oriented in the circumferential direction so that the force transmission between the ramp-shaped flanks 1721 and 1731 takes place when the thread is screwed in or on and tightened towards the face of the connector. If, by contrast, a torque is applied in a direction in which the circumferential force is transmitted between the steep flanks 1722 and 1732, a torque can be transmitted which is substantially limited by the mechanical strength of the teeth of the threaded coupling element and the detent. This means that the torque which can be applied or supported via the coupling 17 in order to tighten the thread is limited by the coupling, whereas the torque which can be applied or supported via the coupling in order to loosen the thread is larger in any case than the maximum possible tightening torque. It can therefore be ensured that the thread is not overloaded and damaged when it is tightened, while on the other hand it is ensured that a threaded connection, once established, can be detached again.

It can be provided that means are arranged which make it possible to bridge or block the coupling so that a threaded connection, once established, can also be detached again if the detent 173 and/or the toothing of the threaded coupling element are damaged or worn so that they can no longer transmit any circumferential force or torque which is sufficient to detach the threaded connection. In a very simple configuration, an opening can be provided in the housing of the connector, through which opening a screwdriver or other suitable object can be introduced in order to block the relative movement of the threaded coupling element relative to the component-fixed coupling element. Another exemplary embodiment, in which the means for emergency blocking of the coupling are integrated directly in the connector, is illustrated in FIGS. 9 to 12.

Figure 9:
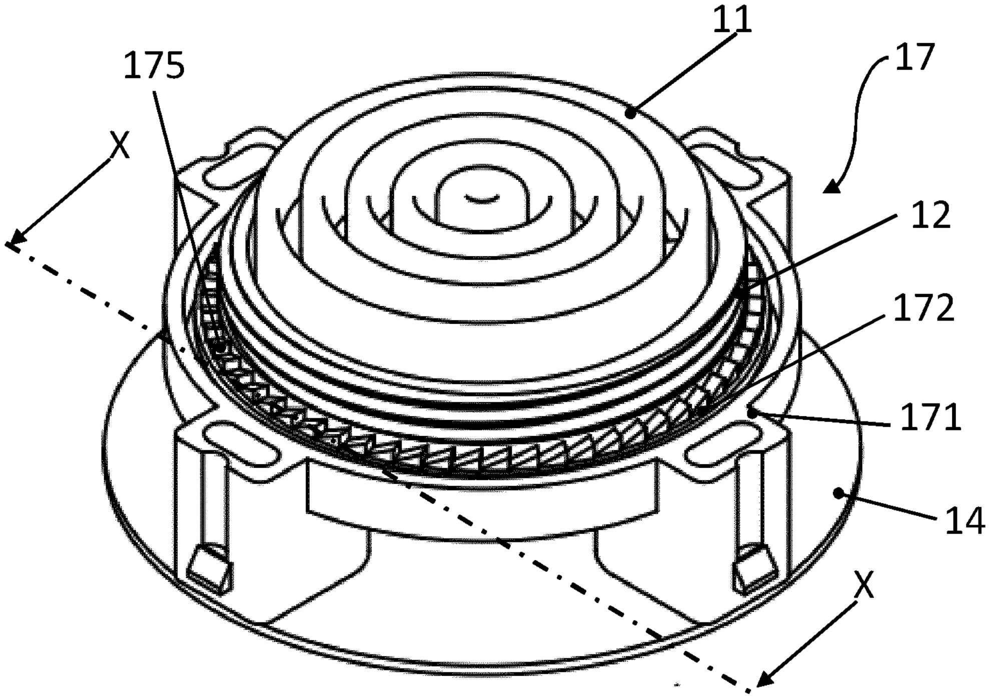
FIG. 9 shows a second exemplary embodiment of a base plate and an electrical connecting element with a fastening thread which is connected to the base plate and the electrical connecting element via a coupling.
Figure 10:
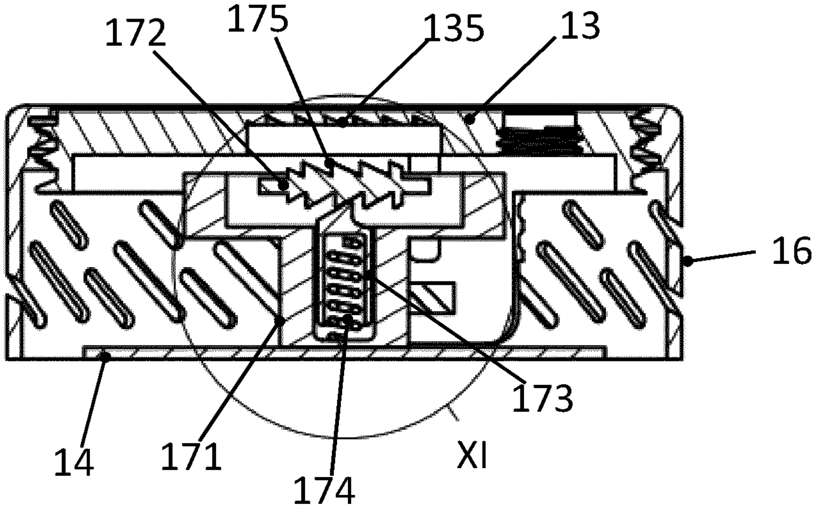
FIG. 10 shows a sectional view from FIG. 9, in which the force transmission and release mechanism of the coupling is visible.
Figure 11:
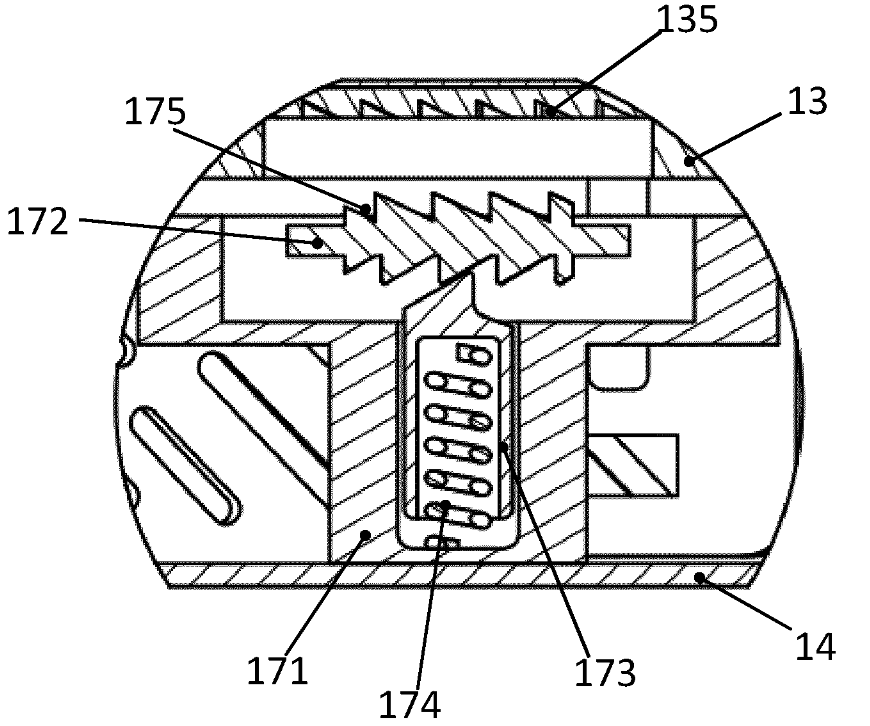
FIG. 11 shows a detailed representation of the force transmission and release mechanism from FIG. 10.
Figure 12:
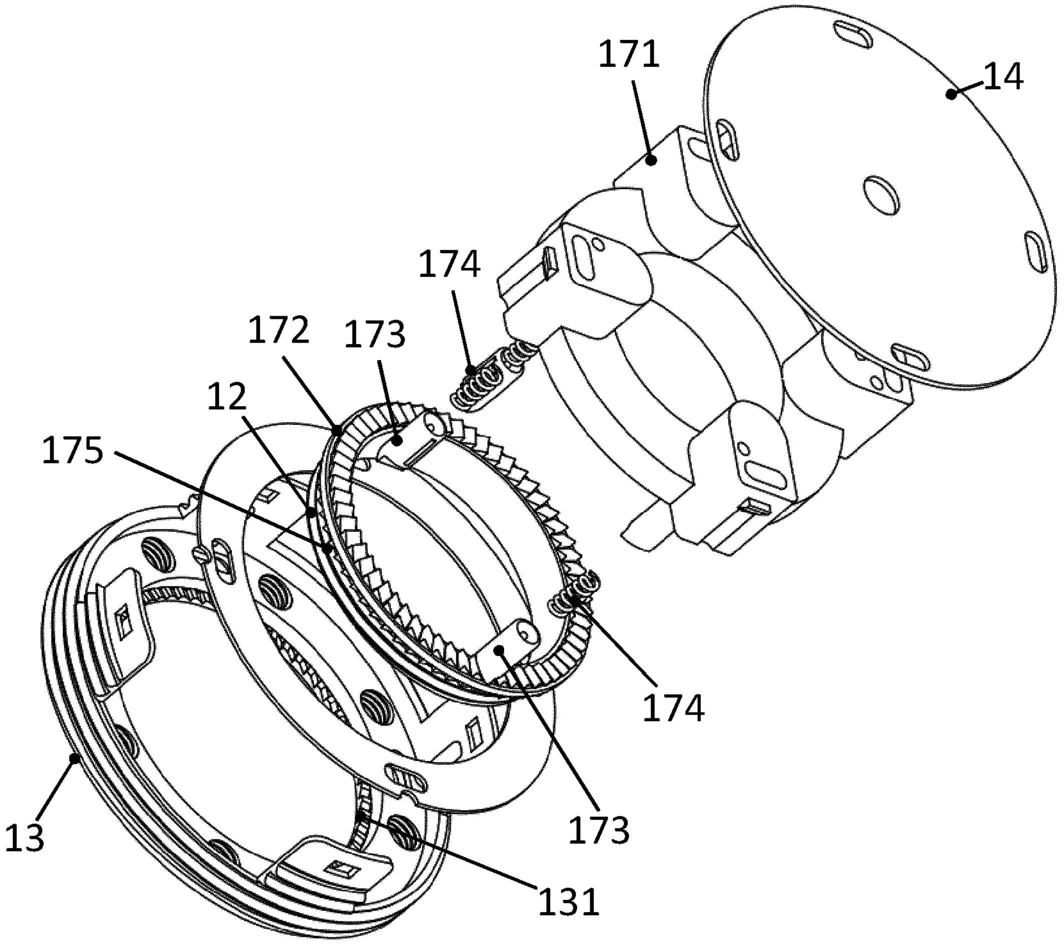
FIG. 12 shows a detailed exploded view of the coupling from FIGS. 9 to 11.

FIG. 9 depicts a view similar to FIG. 6, wherein in addition to the toothing which interacts with the detent 173, a toothing 175 on the face is also arranged on the threaded coupling element 172, the teeth of which are arranged towards the face of the connector. FIG. 10 shows a sectional view along the line designated by X-X in FIG. 9. It can be seen that the toothing on the face 175 likewise has teeth which are unsymmetrical in the circumferential direction of the threaded coupling element. The flatter side of the teeth points in the same direction as in the case of the toothing which interacts with the detent 173. On the inner side, the carrier 13 has a toothing 135 which is complementary to the toothing on the face 175 of the threaded coupling element 172, which likewise extends annularly on the same radius as the toothing 175. It can easily be seen that if the toothing 175 engages in the toothing 135, the latter blocks the coupling in the same direction as the detent in cooperation with the toothing on the rear side of the threaded coupling element. This is depicted in more detail in FIG. 11 as detail XI from FIG. 10. When tightening the connection thread of the connectors, a pressure pointing away from the face is normally exerted on the thread and, consequently, on the threaded coupling element 172 in such a way that the toothing 175 and the toothing 135 are separated, as depicted in FIGS. 10 and 11. In the event that, due to wear and tear or other damage, no more force can be transmitted between the detent and the threaded coupling element, which would be sufficient to detach the mechanical connection between two coupling elements, that is to say, to unscrew a consumer connection unit from an installation unit, for example, it is possible to pull on the consumer connection unit. As a result, the toothings 175 and 135 on the installation unit come into engagement with each other in such a way that at least in the direction in which the steep tooth flanks interact, the rotation of the threaded coupling element 172 in the installation unit is blocked, in such a manner that detaching the screw connection between the installation unit and a consumer connection unit, or more generally two connectors, is made possible. In FIG. 12, the interacting components are depicted again in an exploded view.

Although the subject-matter of the present description has been explained on the basis of selected exemplary embodiments, these are not intended to restrict the claimed invention. The claims comprise embodiments which are not explicitly depicted, and embodiments which deviate from the shown examples are nevertheless covered by the claims.

What is claimed is:

1. A connection system comprising:

a female connector and a male connector, each of the female connector and the male connector configured to be operably connected to the other via a mating engagement and having a circular face; and at least one ferromagnetic element arranged along the circular face of each of the female connector and the male connector at a defined distance from a respective axis of each of the female connector and the male connector, wherein the defined distance of the at least one ferromagnetic element from the respective axis is identical in both the female connector and the male connector, each of the at least one ferromagnetic elements comprising at least one permanent magnet, and wherein, when the female connector is operably connected to the male connector, each of the at least one permanent magnets have a first position relative to each other in which the permanent magnets are attracted to each other and a second position relative to each other in which the permanent magnets are not attracted to each other, wherein the female connector comprises a socket and the male connector comprises a plug, the socket comprising at least one contact element and the plug comprising at least one contact element, each contact element being accessible from the circular face of the respective female connector and male connector and being configured to be operably connected to each other via the mating engagement when the axes of the female connector and the male connector are congruent, wherein the at least one contact element of the socket is countersunk within the socket and is accessible through at least one contact opening of the socket and the at least one contact element of the plug can be introduced into the at least one contact opening of the socket, wherein the female connector comprises a first fastening thread arranged on the circular face of the female connector and the male connector comprises a second fastening thread arranged on the circular face of the male connector, a thread axis of the first fastening thread coinciding with the axis of the female connector and a thread axis of the second fastening thread coinciding with the axis of the male connector, the first fastening thread and the second fastening thread being configured to be screwed together when the male connector is rotated relative to the female connector, and wherein in a first rotational orientation of the male connector relative to the female connector the permanent magnets are in the first position relative to each other to secure the male connector to the female connector and in a second rotational orientation of the male connector relative to the female connector the permanent magnets are in the second position relative to each to release the male connector from the female connector.

2. The connection system of claim 1, wherein the socket is a multipolar socket, and the plug is a multipolar plug, wherein the at least one contact element of the socket, which is accessible through a single contact opening, belongs to a first pole, and the at least one contact element of the plug belongs to a second pole.

3. The connection system of claim 1, wherein the at least one contact opening of the socket comprises a central opening and the at least one contact element of the plug comprises a central pin.

4. A connector for the connection system of claim 1.

5. The connector of claim 4, wherein each at least one ferromagnetic element is arranged along an outer edge of each respective circular face of the female connector and the male connector.

6. The connector of claim 4, wherein each at least one ferromagnetic element comprises a plurality of discrete ferromagnetic elements which are uniformly distributed annularly around the respective axes of the female connector and the male connector.

7. The connector of claim 4, wherein the connector is the male connector and the at least one contact element is configured as at least one ring which extends in a centered manner around the axis of the male connector.

8. The connector of claim 4, wherein the connector is the male connector and the at least one contact element is a central pin.

9. The connector of claim 4, wherein the connector is the female connector and the at least one contact element is arranged at least 5 mm deep within the at least one contact opening, and a minimum cross-sectional dimension of the at least one contact opening is a maximum of 4 mm.

10. The connection system of claim 1, wherein at least one of the first fastening thread and the second fastening thread is arranged on a thread element which is connected to the female connector or the male connector via a torque-controlled coupling which limits a torque which can be transmitted between the at least one of the first fastening thread and the second fastening thread and the female connector or the male connector at least in one direction of rotation, and wherein a torque which can be transmitted when tightening the at least one of the first fastening thread and the second fastening thread is larger than a torque which can be transmitted when unscrewing the at least one of the first fastening thread and the second fastening thread.

11. The connection system of claim 1, wherein at least one of the female connector and the male connector has a housing which is perforated in such a way that ambient air can flow through the housing into the at least one of female connector and the male connector.

12. The connection system of claim 11, wherein the female connector comprises the housing.

13. The connection system of claim 11, wherein the housing has a rear side opposite the circular face of the at least one of the female connector and the male connector, the rear side of the housing being configured to be fastened to a ceiling or a wall of a building.

14. The connection system of claim 1, wherein each of the at least one ferromagnetic elements comprises at least one pair of ferromagnetic elements, a first pair of which is arranged on the female connector and a second pair of which is arranged on the male connector.

15. A connection system comprising:

a female connector and a male connector, each of the female connector and the male connector being configured to be operably connected to each other via a mating engagement and having a circular face; and a plurality of ferromagnetic elements arranged along a periphery of the circular face of each of the female connector and the male connector and being configured to magnetically engage with one another when the female connector and the male connector are operably connected, wherein the female connector comprises at least one annular socket on the circular face of the female connector and the male connector comprises at least one annular plug on the circular face of the male connector, the at least one annular socket comprising a plurality of first contact elements countersunk within the annular socket and accessible through at least one contact opening of the annular socket such that the plurality of first contact elements are arranged in one or more rings coaxial to an axis of the female connector, the least one annular plug comprising a plurality of second contact elements configured to be introduced into the at least one contact opening of the annular socket of the female connector to operably connect the male connector to the female connector when an axis of the male connector is congruent with the axis of the female connector.

16. The connection system of claim 15, wherein the at least one annular socket comprises a plurality of concentric annular sockets of differing diameter, each of the plurality of annular sockets having a plurality of first contact elements countersunk within the annular socket, and wherein the at least one annular plug comprises a plurality of annular plugs configured to be received within the plurality of annular sockets, each of the plurality of annular plugs having a plurality of second contact elements.

17. The connection system of claim 15, wherein in a first rotational orientation of the female connector and the male connector relative to each other the plurality of ferromagnetic elements are in a first position relative to each other to form a connection between the female connector and the male connector together and in a second rotational orientation of the female connector and the male connector relative to each other the plurality of ferromagnetic elements are in a second position relative to each to release the connection between the female connector and the male connector.

18. The connection system of claim 15, wherein the female connector comprises a perforated housing configured to allow ambient air to flow through the perforated housing into the female connector.

19. The connection system of claim 18, wherein the perforated housing has a rear side opposite the circular face of the female connector, the rear side of the perforated housing being configured to be fastened to a ceiling or a wall of a building.

20. The connection system of claim 18, wherein the perforated housing is configured to house a smoke detector, speaker, camera, router, and/or WLAN access point.

* * * * *